Patented Feb. 15, 1944

2,341,918

UNITED STATES PATENT OFFICE 2,341,918

METHOD OF REMOVING MERCAPTANS FROM HYDROCARBON OIL

Lawrence M. Henderson, Winnetka, and George W. Ayers, Jr., Chicago, Ill., and Timothy L. McNamara, Washington, D. C., assignors to The Pure Oil Company, Chicago, Ill., a corporation of Ohio No Drawing. Application September 15, 1941, Serial No. 410,890

15 Claims. (Cl. 196—30)

This invention relates to a process for removing acidic bodies from otherwise neutral water immiscible fluids. More particularly, the invention resides in a process for removing mercaptans from hydrocarbon liquids.

It is well known in the petroleum refining art to extract mercaptans from petroleum distillates by means of aqueous solutions of alkali metal hydroxide which have been fortified with solubility promoters, that is, reagents which enhance the ability of the alkali solution to extract mercaptans from the distillate. A process of this type known as the "solutizer" process, which utilizes a potassium hydroxide solution containing potassium iso-butyrate is in commercial use. Another process, which is in commercial use, utilizes a sodium hydroxide solution containing naphthenic acids and cresol and is known as the "Mercapsol" process.

Alkali reaction products of alkyl phenols per se have also been suggested as solubility promoters in the extraction of mercaptans from hydrocarbon distillates by means of alkali solutions. While alkali metal alkyl phenolates are effective solubility promoters their effectiveness is usually not as great as that of solubility promoters now in commercial use.

We have discovered that the effectiveness of alkali phenolates as solubility promoters can be increased by halogenation. Halogenated alkali phenolates on a weight for weight basis are more effective than the corresponding alkali phenolates in removing mercaptans.

Our invention contemplates the use of halogenated mono- and poly-hydroxy aromatic hydrocarbons containing one or more halogen atoms in the molecule attached to carbon in the aromatic ring, and the alkali metal salts thereof. As examples of compounds which are useful in accordance with our invention may be mentioned ortho and para-chloro-phenol, p-chloro-metacresol, 2,4,5-tri-chloro-phenol, dichloro-catechol, p-chloro-catechol and mono-chlorohydroquinone.

In order to be effective as solubility promoters, the halogenated hydroxy aromatic hydrocarbon should be soluble in an aqueous alkali metal hydroxide solution, containing at least 7 per cent of free alkali metal hydroxide, to the extent of at least 5% by weight based on the total weight of the solution. By the term "free alkali metal hydroxide" is meant alkali metal hydroxide present in the solution over and above that amount which is necessary to react with the halogenated hydroxy aromatic hydrocarbon to form the alkali metal compound thereof.

Although alkali metal hydroxides in general are useful for preparing reagents, for use in our invention we have found that sodium and potassium hydroxide are preferable. Potassium hydroxide solutions are more effective than sodium hydroxide solutions in extracting mercaptans. The treating solution in order to be effective should contain at least 7% of free alkali hydroxide and may contain up to an amount which will saturate the solution, although amounts in excess of 30% of free sodium hydroxide are not desirable for the reason that the solution becomes too viscous when greater amounts are present, causing emulsion difficulties during treatment.

The treating solution should contain not less than 5% of the halogenated hydroxy aromatic compound and may contain an amount up to the saturation point, although amounts in excess of 30% are not preferred for the reason that such solutions are too viscous for efficient treating. The amounts of halogenated hydroxy aromatic compounds specified are in terms of the halogenated phenol and not in terms of the phenolate.

In preparing treating solutions in accordance with our invention, the desired quantity of alkali metal phenolate of the halogenated hydroxy hydrocarbon may be added to an aqueous alkali metal hydroxide solution of desired concentration, or the halogenated hydroxy aromatic hydrocarbon may be added to an aqueous alkali solution containing sufficient alkali metal hydroxide to react with the halogenated hydroxy aromatic hydrocarbon and still leave sufficient free alkali metal hydroxide in the solution.

In treating fluids such as gasoline or other petroleum distillates with treating solutions in accordance with our invention, the fluid is contacted with the treating solution under existing conditions of atmospheric temperature and pressure, either batch-wise or in a countercurrent system. Although the ratio of treating solution to fluid to be treated may vary within wide limits, we have found that from 5 to 15% by volume of the treating solution based on the distillate or other fluid to be treated gives good results. It is preferable to carry out the treatment in a closed system in the absence of air since certain compounds, such as chlorohydroquinone, have a tendency to induce oxidation, thereby causing discoloration of the distillate and conversion of mercaptides to disulfides which remain in the distillate being treated.

Treating solutions in accordance with our invention can be readily regenerated after use by heating to the boiling point of the solution, either in the presence or absence of live steam. The use of live steam expedites the regeneration of the solution. In practice, live steam is generally blow through the solution at a temperature of 220 to 250° F., causing hydrolysis of the mercaptides to mercaptans which pass overhead with the steam. The alkali halogenated hydroxy aromatic compounds do not hydrolyze under these conditions and, therefore, remain in the solution. The solution after regeneration can be recycled for treatment of further quantities of fluid. It is preferable to adjust the concentration of the solution before recirculation by addition of such quantities of water, alkali metal hydroxide and/or halogenated hydroxy aromatic hydrocarbons or their alkali metal reaction products, as the solution may require in order to maintain the concentration of the various constituents of the solution at a fixed value.

In addition to being more effective than the unhalogenated phenolates as solubility promoters, the halogenated compounds have the additional advantage of being higher boiling and more resistant to hydrolysis, thereby suffering smaller loss during regeneration.

The following examples are given in order to illustrate the invention:

(*), the samples were shaken under an atmosphere of nitrogen in order to prevent any possible oxidation of mercaptans to disulfides. Analysis for disulfides in the gasoline showed that none were present either before or after treatment, thereby proving that mercaptans were extracted and not merely oxidized to disulfides.

It will be seen from the foregoing table that not only do halogenated alkali metal phenolates improve the mercaptan extracting ability of alkali solutions, but that equivalent weights of halogenated phenols enhance the ability of alkali solutions to extract mercaptans from gasoline more than do the equivalent amounts of unhalogenated phenols.

We claim:

1. The method of removing acidic bodies from an otherwise neutral water-immiscible organic fluid which comprises contacting said fluid with a solution containing free alkali metal hydroxide in an amount not less than approximately 7% by weight and a nuclear halogenated, hydroxylated aromatic hydrocarbon containing an alkali metal substituted for hydrogen in at least one hydroxyl group, in an amount not less than 5% by weight, calculated on the basis of the halogenated hydroxylated aromatic hydrocarbon.

2. Method in accordance with claim 1, in which

*Table I*

| Composition of treating agent | Per cent by vol. of reagent to gasoline | Per cent free alkali hydroxide in reagent | Per cent mercaptan sulfur in raw gasoline | Per cent mercaptan sulfur in treat. gasoline | Per cent mercaptan sulfur removed |
|---|---|---|---|---|---|
| Water, 85.4 gms. NaOH, 14.6 gms. | 7 | 14.6 | 0.027 | 0.0139 | 49 |
| Water, 55.91 gms. Sodium o-chloro-phenate, 29.49 gms. NaOH, 14.6 gms. | 7 | 14.6 | 0.027 | 0.0083 | 69 |
| Water, 56.1 gms. NaOH, 14.6 gms. Sodium p-chloro-phenate, 29.3 gms. | 7 | 14.6 | 0.027 | 0.0068 | 75 |
| *Water, 85.4 gms. *NaOH, 14.6 gms. | 7 | 14.6 | 0.0248 | 0.0133 | 46 |
| *Water, 56.1 gms. *Sodium o-chloro-phenate, 29.3 gms. *NaOH, 14.6 gms. | 7 | 14.6 | 0.0248 | 0.0069 | 72 |
| Water, 85.4 gms. NaOH, 14.6 gms. | 10 | 14.6 | 0.0265 | 0.0140 | 47 |
| NaOH (total), 14.6 gms. Phenol, 25 gms. Water, 60.4 gms. | 10 | 4.0 | 0.0265 | 0.0163 | 38 |
| NaOH (total), 14.6 gms. 2,4,5 tri-chloro-phenol, 25 gms. Water, 60.4 gms. | 10 | 9.5 | 0.0265 | 0.0108 | 59 |
| *Water, 85 gms. *NaOH, 15 gms. | 10 | 15 | 0.0186 | 0.0088 | 53 |
| *Water, 65.44 gms. *Sodium salt of chloro-hydroquinone, 19.56 gms. *NaOH, 15 gms. | 10 | 15 | 0.0186 | 0.0058 | 69 |
| KOH, 20.6 gms. Water, 79.4 gms. | 10 | 20.6 | 0.0196 | 0.0114 | 42 |
| KOH (total), 20.6 gms. Hydroquinone, 25 gms. Water, 54.4 gms. | 10 | | 0.0196 | 0.0082 | 58 |
| KOH (total), 20.6 gms. Mono-chloro-hydroquinone, 25 gms. Water, 54.4 gms. | 10 | 1.1 | 0.0196 | 0.0027 | 88 |
| NaOH, 15 gms. Water, 85 gms. | 7 | 15 | 0.0152 | 0.0106 | 30 |
| NaOH, 15 gms. Sodium salt mono-chlorohydroquinone, 16.4 gms. Water, 68.6 gms. | 7 | 15 | 0.0152 | 0.0092 | 40 |
| NaOH, 15 gms. Water, 85 gms. | 7 | 15 | 0.0115 | 0.0084 | 27 |
| NaOH (total), 15 gms. Meta-cresol, 15 gms. Water, 70 gms. | 7 | 9.4 | 0.0115 | 0.0068 | 41 |
| NaOH (total), 15 gms. Para-chloro-meta-cresol, 15 gms. Water, 70 gms. | 7 | 10.8 | 0.0115 | 0.0061 | 47 |
| NaOH, 15 gms. Water, 85 gms. | | 15 | 0.0079 | 0.0049 | 38 |
| NaOH (total), 15 gms. Di-chloro-catechol, 25 gms. Water, 60 gms. | | 3.8 | 0.0079 | 0.0038 | 52 |

In the examples given in the foregoing tables, the gasoline and treating reagent were shaken together for approximately five minutes. In the case of those examples marked with an asterisk the alkali metal hydroxide is selected from the group consisting of sodium and potassium hydroxide and the nuclear halogenated hydroxylated aromatic hydrocarbon is a chlorinated hydroxylated aromatic hydrocarbon which in the form of the alkali metal compound defined in claim 1 is soluble in the solution to the extent of at least 10% by weight.

3. Method in accordance with claim 1 in which the nuclear halogenated hydroxylated aromatic hydrocarbon is selected from the group consisting of chlorinated phenol, chlorinated cresol and chlorinated dihydroxy benzene.

4. The method of removing mercaptans from hydrocarbon oils which comprises contacting said oils with a solution containing not less than about 7% by weight of free alkali metal hydroxide and not less than 5% of a nuclear halogenated, hydroxylated aromatic hydrocarbon present in the solution in combination with alkali metal substituted for hydrogen in at least one hydroxyl group.

5. Method in accordance with claim 4 in which the halogenated, hydroxylated aromatic hydrocarbon is selected from the group consisting of chlorinated phenol, chlorinated cresol and chlorinated dihydroxy benzene.

6. Method in accordance with claim 4 in which the free alkali metal hydroxide is present in amounts between about 7% to 30% by weight and the halogenated, hydroxylated aromatic hydrocarbon is present in amounts between 10% and 30% by weight.

7. Method in accordance with claim 4 in which the halogenated hydroxylated aromatic hydrocarbon is a chlorophenol.

8. Method in accordance with claim 4 in which the halogenated hydroxylated aromatic hydrocarbon is a chlorocresol.

9. Method in accordance with claim 4 in which the halogenated hydroxylated aromatic hydrocarbon is a chlorinated dihydroxy benzene.

10. Method in accordance with claim 4 in which the halogenated hydroxylated aromatic hydrocarbon is a monochlorphenol.

11. Method in accordance with claim 4 in which the halogenated hydroxylated aromatic hydrocarbon is a monochlor-cresol.

12. Method in accordance with claim 4 in which the halogenated hydroxylated aromatic hydrocarbon is a dichlor-dihydroxy benzene.

13. Method in accordance with claim 4 in which the halogenated hydroxylated aromatic hydrocarbon is a tri-chlor-phenol.

14. Method in accordance with claim 4 in which the halogenated hydroxylated aromatic hydrocarbon is a chlorohydroquinone.

15. Method in accordance with claim 4 in which the halogenated hydroxylated aromatic hydrocarbon is a dichloro-catechol.

LAWRENCE M. HENDERSON
GEORGE W. AYERS, Jr.
TIMOTHY L. McNAMARA.